United States Patent [19]

Rutten

[11] 4,269,561
[45] May 26, 1981

[54] APPARATUS FOR LOADING AND UNLOADING OBJECTS RELATIVE TO A CARRIER VEHICLE

[76] Inventor: Paul J. Rutten, 1818 13th St., South, Great Falls, Mont. 59405

[21] Appl. No.: 27,399

[22] Filed: Apr. 5, 1979

[51] Int. Cl.³ ............................................. B60R 9/00
[52] U.S. Cl. .................................... 414/462; 414/546
[58] Field of Search .................. 414/462, 546, 678; 280/414 R; 224/310

[56] References Cited

U.S. PATENT DOCUMENTS

| | | |
|---|---|---|
| 1,016,038 | 1/1912 | Samp . |
| 2,486,316 | 10/1949 | Morse et al. . |
| 2,492,841 | 12/1949 | Burkey ............................ 224/310 X |
| 2,550,185 | 4/1951 | Busch ............................. 414/546 X |
| 2,572,778 | 10/1951 | Stephens . |
| 2,584,163 | 2/1952 | Squires . |
| 3,382,993 | 5/1968 | Bahrs . |
| 3,387,727 | 6/1968 | Micheel . |
| 3,708,081 | 1/1973 | Schladenhauffen . |
| 3,894,643 | 7/1975 | Wilson . |
| 3,999,673 | 12/1976 | Anderson . |

Primary Examiner—Stanley H. Tollberg
Attorney, Agent, or Firm—Burns, Doane, Swecker & Mathis

[57] ABSTRACT

An apparatus is provided for loading an object, such as a boat, onto a carrier vehicle having a support mechanism for receiving the object. The apparatus comprises a pair of lift arms mounted for vertical swinging movement about a horizontal rotary axis. Outer ends of the lift arms are connectible to the object. A power winch assembly includes a cable for swinging the lift arms about the rotary axis. A cable fulcrum is mounted on the carrier vehicle and is engaged by the cable. The power assembly is actuable to first wind-in the cable to raise the lift arms and thereafter pay-out the cable to allow the object to gravitate onto the ground or support structure. The cable fulcrum is movable between positions located on opposite sides of the rotary axis during loading and unloading modes, respectively, to enable the center of gravity of the object to be shifted past the rotary axis, without the need for operator assistance.

12 Claims, 7 Drawing Figures

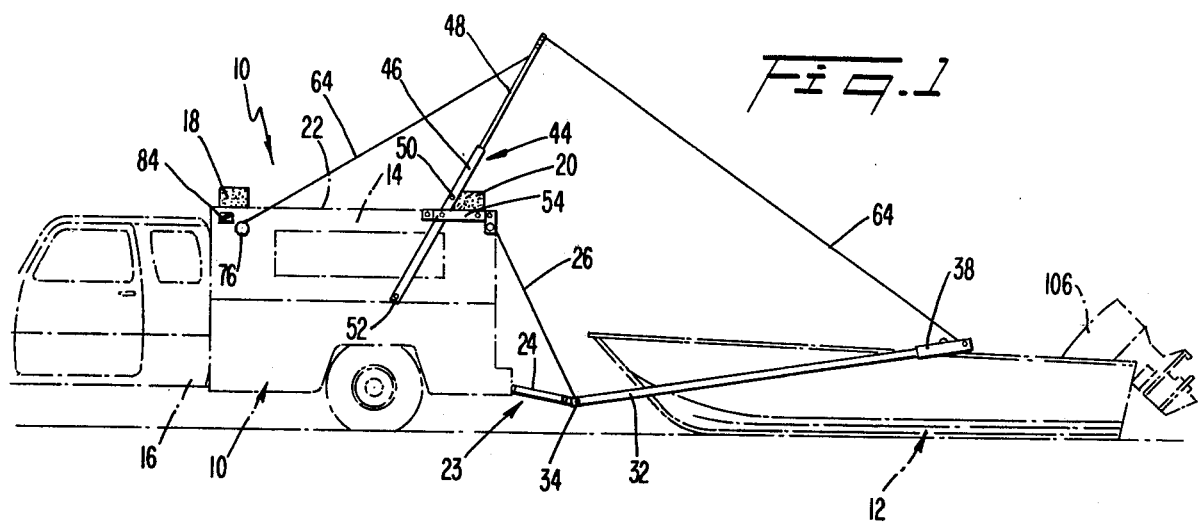
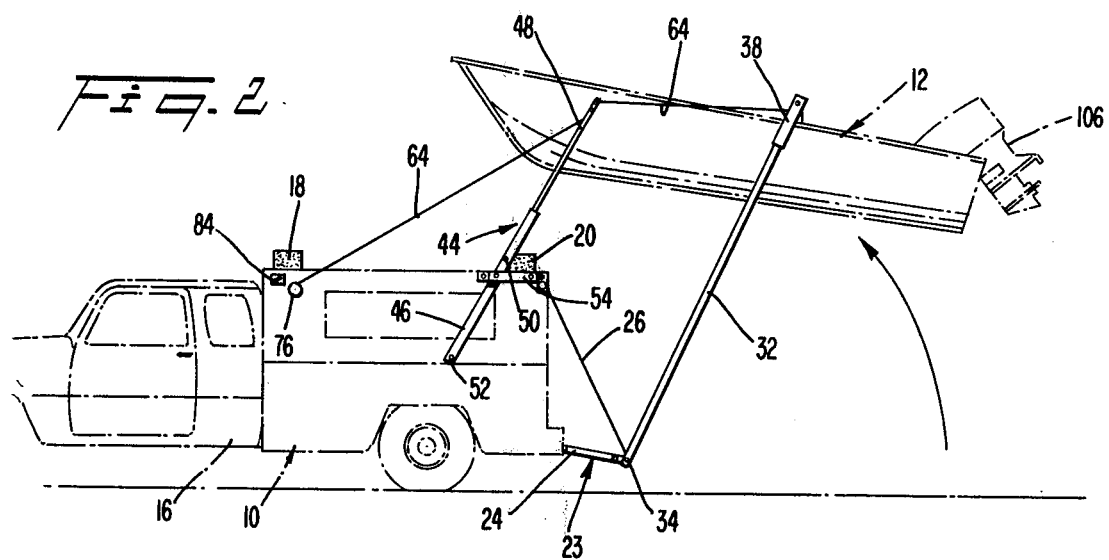
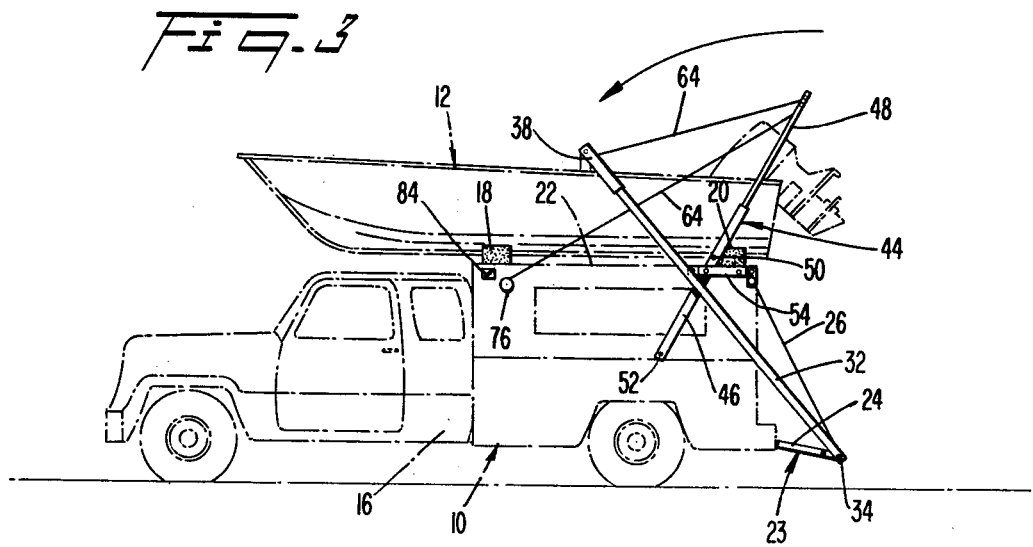

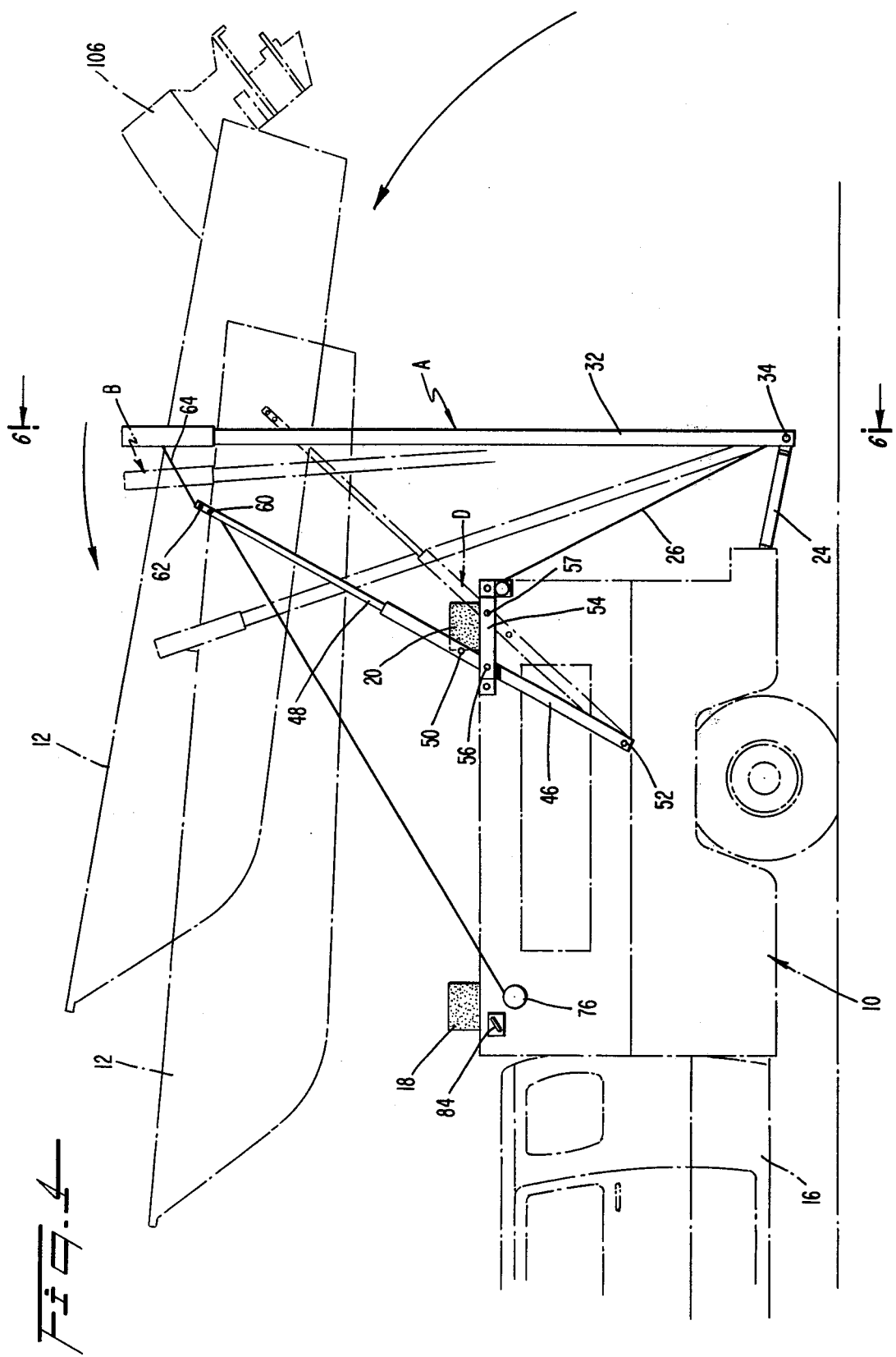

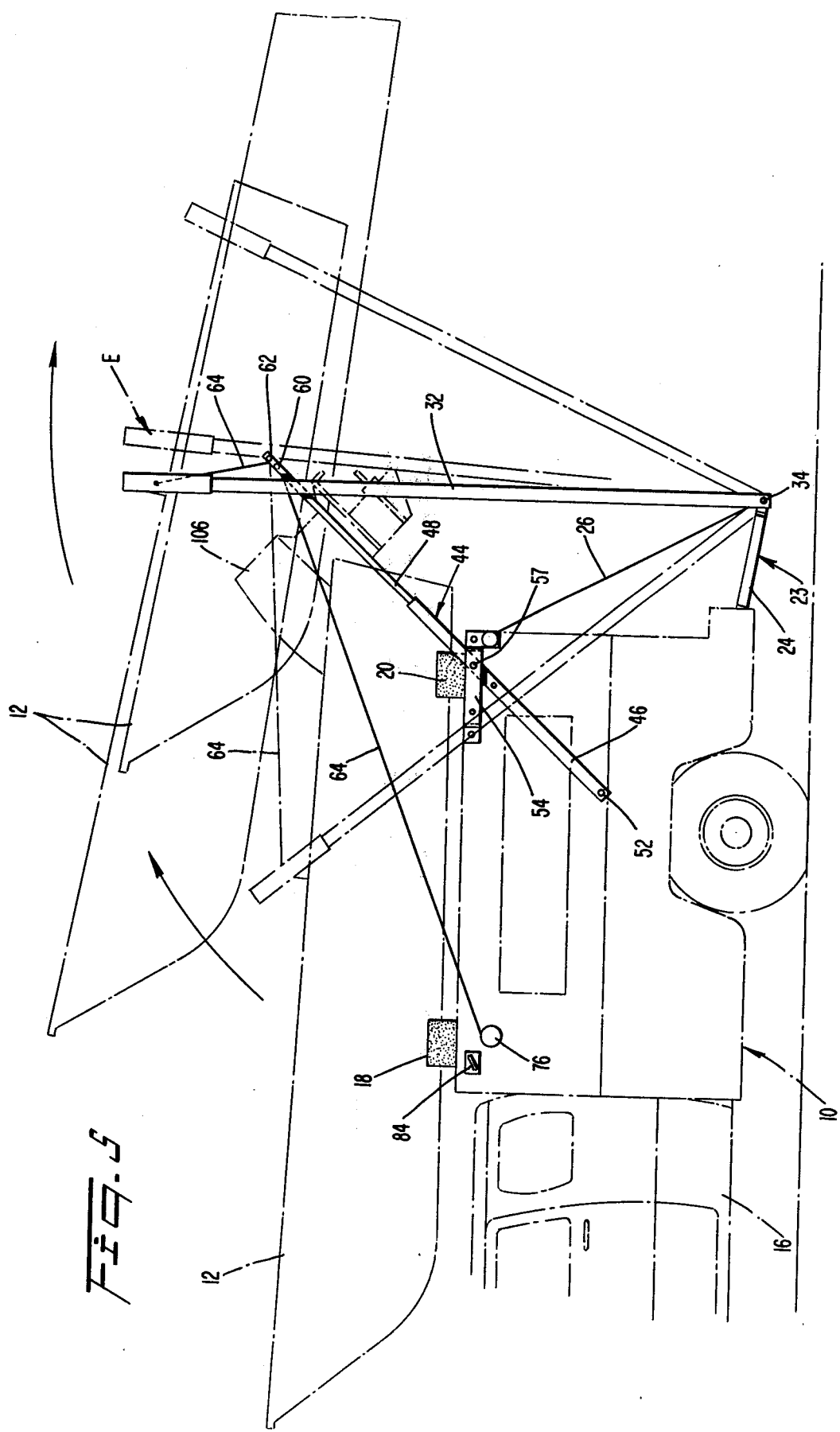

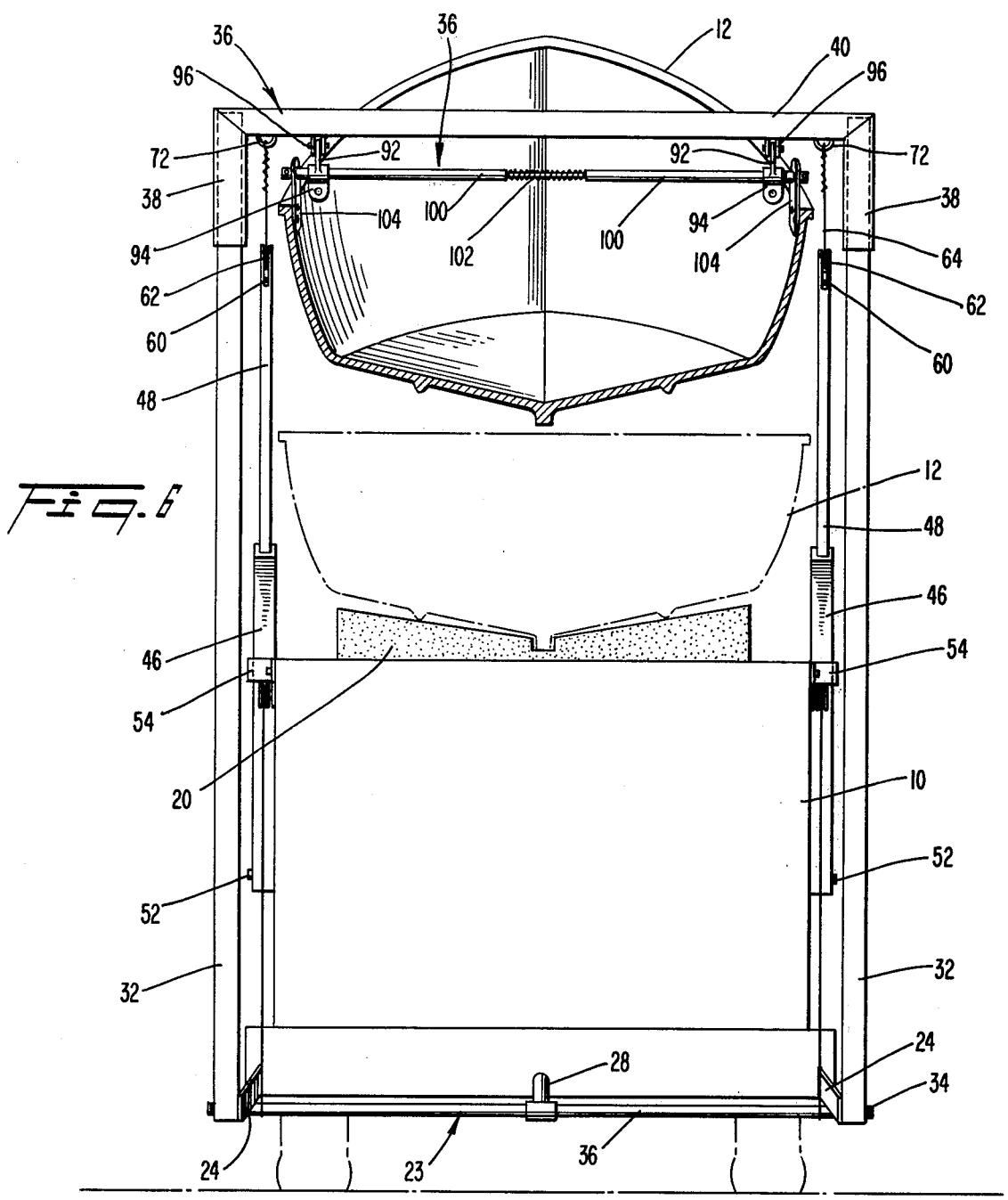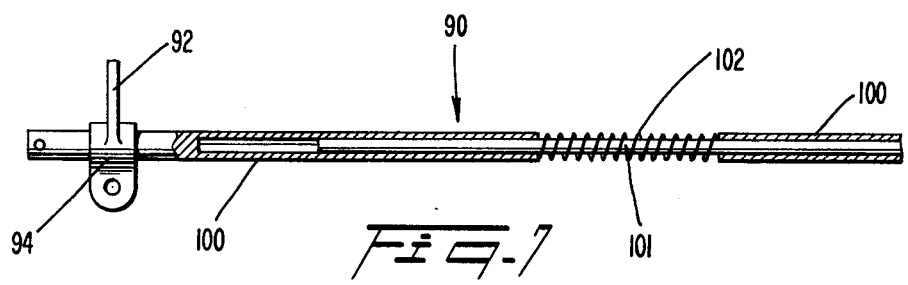

APPARATUS FOR LOADING AND UNLOADING OBJECTS RELATIVE TO A CARRIER VEHICLE

BACKGROUND AND OBJECTS OF THE INVENTION

The present invention relates to the loading of objects such as boats and snowmobiles for example, onto a carrier vehicle.

In order to make use of various objects, such as boats and snowmobiles for example, it is often necessary that they be transported between locations. This can be accomplished by mounting the object on a trailer which is pulled behind a towing vehicle. However, it can be difficult to physically load the object onto the trailer, and the presence of the trailer eliminates the ability to tow other structures, such as a mobile home. Moreover, the purchase of the trailer involves an additional expense, and the trailer must be stored when not in use. When hauling an object such as a boat, the trailer is usually backed into the water for loading and unloading, which can result in physical damage occurring to the trailer produced by the water, especially by salt water.

Proposals have heretofore been made involving power actuated mechanisms for raising boats onto the roof of a carrier vehicle, thereby eliminating the need for a trailer. Exemplary of such proposals are the disclosures in U.S. Pat. No. 3,708,081 issued to Schladenhauffen on Jan. 2, 1973, U.S. Pat. No. 3,894,643 issued to Wilson on July 15, 1975, and U.S. Pat. No. 3,999,673 issued to Anderson on Dec. 28, 1976. The power actuated mechanisms disclosed in such patents are mounted to the vehicle and are connectible to a boat. By actuation of an electrically or manually powered winch, the boat is raised onto, or lowered from, the carrier vehicle.

However, mechanisms heretofore proposeed may be quite complex to assemble and operate, may require operation by more than one person, may be cumbersome to store, and/or may require that the boat be initially disposed in an inverted position. With regard to the latter point, it would be most convenient, especially as regards boats, to be able to load the boat while the latter is in an upright position. In this manner, the boat can be directly raised from, or set into, the water, without the need for removing an outboard motor which may be mounted on the boat.

It is, therefore, an object of the present invention to minimize or obviate the problems of the previously discussed type.

It is another object of the present invention to provide a novel apparatus for raising an object, especially a boat or snowmobile, onto a carrier vehicle.

It is still another object of the present invention to provide such apparatus which can be conveniently operated by one person.

It is an additional object of the present invention to provide such apparatus which lifts and deposits the object while the latter is in an upright condition.

It is still another object of the present invention to provide such apparatus which is easy to assemble, disassemble, and store.

It is yet another object of the present invention to provide such an apparatus which is simple to operate and relatively inexpensive to construct.

SUMMARY OF THE INVENTION

The objects of the present invention are achieved by apparatus for loading an object onto a carrier vehicle having support structure for receiving the object. The apparatus comprises a pair of lift arms mounted at their inner ends for vertical swinging movement about a horizontal rotary axis. A connector is connectible to outer ends of the lift arms for connecting the latter to the object. A power winch assembly is mounted on the carrier vehicle and includes a cable connected to the lift arms for swinging the latter about the rotary axis. A cable fulcrum is mounted on the carrier vehicle and is engaged by the cable. The cable fulcrum is movable between a first position located to one side of the rotary axis toward the vehicle, and a second position located to the other sie of the rotary axis away from the vehicle. The power winch assembly is actuable during a loading mode in a first direction for winding-in the cable to raise the lift arms and object and shift the center of gravity of the object toward the vehicle and past the rotary axis, with the fulcrum located in its first position. Thereafter, the power winch assembly is actuable in a second direction for paying-out the cable to allow the object to gravitate downwardly onto the support structure of the carrier vehicle. The power winch assembly is actuable during an unloading mode in the first direction for winding-in the cable to raise the object from the support structure and shift the center of gravity of the object away from the vehicle and past the rotary axis with the fulcrum located in its second position. Thereafter, the power winch assembly pays-out the cable to allow the object to gravitate downwardly to an unloaded position.

THE DRAWINGS

These advantages of the present invention will become apparent from the subsequent detailed description of a preferred embodiment thereof, in connection with the accompanying drawings in which like numerals designate like elements and in which:

FIG. 1 is a side elevational view of a loading apparatus according to the present invention in position to raise a boat onto a carrier vehicle;

FIG. 2 is a view similar to FIG. 1 depicting the boat in a raised position;

FIG. 3 is a view similar to FIG. 1 depicting the boat in a fully raised position;

FIG. 4 is a side elevational view of the carrier and boat during a phase of the loading operation wherein the center of gravity of the boat is carried forwardly past the rotary axis of the lift arms;

FIG. 5 is a view similar to FIG. 4 depicting the stages of operation during the unloading operation as the center of gravity of the boat passes rearwardly of the rotary axis of the lift arms;

FIG. 6 is a cross-sectional view taken along lines 6—6 of FIG. 4; and

FIG. 7 is a fragmentary view of a mechanism which connects the lift arms to the boat.

DETAILED DESCRIPTION OF A PREFERRED EMBODIMENT OF THE INVENTION

In FIG. 1 there is depicted a carrier vehicle 10 and a boat 12 which is to be loaded onto the roof of the carrier vehicle. The illustrated carrier vehicle is of the type on which a camper body 14 is mounted on a standard pickup truck body 16. Spaced support structures 18, 20 are mounted on the roof 22 of the camper body 14 to receive the boat 12 when the latter has been loaded.

Mounted on the rear end of the carrier vehicle is a support assembly 23 which includes a pair of support arms 24 (FIGS. 1 and 6) detachably fastened at their forward ends to the frame of the carrier vehicle 10 by any suitable means. A pair of cables 26 are connected between the rear ends of the support arms 24 and the body of the camper top to support the support arms 24 and assure that the support assembly 23 is firmly anchored. A third support arm 28 may be provided intermediate the outer support arms 24 and may suitable bracing rods may be connected to the support arms.

Connected to the support assembly are a pair of lift arms 32. The lift arms 32 are each connected at the inner end thereof to the rearmost ends of the support arms 24 by means of a horizontal pivot axis 34, enabling the lift arms to swing in a vertical direction. The pivot axis 34 may be formed by a horizontal bar 36 extending through the support arms 24, 28 (FIG. 6).

At their outer ends, the lift arms 32 are interconnected by means of a cross-member 36 (FIG. 6). The cross-member 36 includes a pair of tubular sleeves 38 into which the outer ends of the lift arms 32 may be slid and fastened. A lift beam 40 interconnects the sleeves 38 and is securable to the boat 12 in a manner to be discussed.

Mounted on the opposite sides of the carrier vehicle are a pair of control arms 44 (FIG. 1). Each control arm 44 comprises a cylinder 46 and a rod 48 slidable therein. The rod 48 may be manually extended from the cylinder and held in such extended position by a pin 50.

The lower end of each cylinder 46 is pivotably connected to the carrier vehicle 10 by a horizontal pivot pin 52. A U-shaped bracket 54 is attached to each side of the carrier vehicle. The cylinders 46 are positioned within slots formed by the brackets 54 such that the brackets 54 define a limited range of pivotal movement of the control arms in forward and rearward directions. Accordingly, the control arms 44 are movable between rearward and forward positions in which the control arms 44 are inclined upwardly and rearwardly. Aligned holes in the cylinders 46 and bracket 54 (see holes 56, 57 in the bracket 54) can be provided to receive removable pins for holding the control arms 44 selectively in a rearwardmost position (during unloading) and a forwardmost position (during loading). Actually, as will be explained hereinafter, it is possible and perhaps preferable to perform a loading operation without anchoring the arms 44 in their forwardmost position since they will assume such a position automatically during loading.

The upper end of each control arm 44 carries a pair of vertically spaced pulleys 60, 62 which are mounted on horizontal axles. Extending between each pair of pulleys 60, 62 is a lift cable 64 which may comprise steel cord, rope, chains, etc. A forward end of each lift cable is connected to a winch assembly, and a rearward end of each lift cable is attached to an eyelet 72 on the lift beam 40 (FIG. 6). As will be explained, hereafter, during a boat-raising operation the pulleys 60, 62 are located generally forwardly of the pivot axis 34 of the lift arms 32, i.e., forwardly of a vertical plane passing through the axis 34. During an unloading operation, the pulleys 60, 62 are located rearwardly of the pivot axis 34. During the loading and unloading operations, the pulleys form a fulcrum for the cable 64.

Each winch assembly comprises a drum 76 extending from one side of the carrier vehicle 44. The drums 76 are driven by an electric motor (not shown), preferably by an electric motor which is connected to a common axle (not shown) for the two drums 76 which extends horizontally across the width of the camper top. The motor is suitably connected to the electrical system of the engine of the carrier vehicle so as to be driven thereby. The motor is preferably a reversible motor. One suitable motor is commercially available under the name "SuperWinch", model ARV-1500. Manually operable controls 84 for the winch are accessible at one exterior side of the vehicle.

A connector assembly 90 (FIG. 6) for connecting the lift arms 32 to the boat 12 includes a pair of steel straps 92, each having an adjustable pipe-clamp type of bracket 94 affixed at one end thereof. The other ends of the steel straps are pivotably connected to flanges 96 on the beam 40 by horizontal releasable pins. Mounted within the clamps 94 are a pair of rods 100. The rods 100 are each slidable and rotatable relative to the clamps 94. The rods 100 are both slidable on a common rod 101. Inner ends of the rods 100 are biased away from one another by a coil compression spring 102. The spring 102 is yieldable to allow the rods to be moved toward one another. In this manner, the outer ends of the rods can be installed within apertures in brackets 104, the latter being affixed to the boat 12. That is, the rods can be moved toward one another and brought into alignment with the apertures of the brackets 104. Thereafter the rods are released, whereby the spring 102 forces the outer ends of the rods 100 through the apertures in the brackets 104, thereby connecting the boat 12 to the lift arms 32. Cotter pins or the like may be inserted through the ends of the rods 100 to maintain connection with the brackets 104.

The apertures in the brackets 104 are located substantially at the center of gravity of the boat so that the boat is maintained in a substantially horizontal position while being raised. It may be desirable to locate the brackets slightly forwardly of the center of gravity of the boat so that the bow of the boat swings slightly upwardly during a raising operation, to aid in assuring that the bow clears the rear end of the carrier vehicle.

In operation, the carrier vehicle 10 is backed-up to the bow of a boat 12 to be loaded, with the boat being in an upright position (on land or in water). If the boat carries a motor 106, the motor may be maintained in its mounted condition.

The support assembly 23 is secured to the back of the carrier vehicle and the lift arms 32 are connected to the support assembly 23. The cross member 36 is connected to the brackets 104 on the boat, and the outer ends of the lift arms 32 are inserted into the sleeves 38 of the cross member. The winch cables 64 are strung between the pulleys 60, 62, so as to lie below the lower pulley 60 and above the upper pulley 62, and are connected to the lift beam 40. The control arms 44 may be pinned in their forwardmost position as shown, although this is not mandatory.

The winch motor is then actuated by an operator standing adjacent the control 84, to wind-in the cable. As the cable is wound-in, the lift arms 32 swing counterclockwise as shown in FIGS. 2, 4. Thus, the boat 12 is lifted from the ground and gradually raised. With the lift arms 32 approaching a vertical posture A (FIG. 4), the fulcrum pulleys 60, 62 are disposed forwardly of the pivot axis 34. Accordingly, the cables 64 may swing the center of gravity of the boat forwardly of the axis 34. Once that happens, the weight of the boat tends to move the lift arms 32 counterclockwise. Such movement of the lift arms 32 is kept under control because the cable 64 (still being wound-in) allows only a small amount of movement of the boat forwardly of the axis 34 (i.e., to position B). In this position, further forward movement of the boat is resisted by the cables 64. Thereafter, the operator reverses the operation of the winch motor, whereby cable 64 is payed-out slowly. This enables the boat to slowly gravitate forwardly and downwardly onto the supports 18, 20.

As earlier noted, it is not necessary to pin the control arms 44 in their forwardmost position during a loading operation. Rather, the arms may be allowed to sit in their rearwardmost position D (FIG. 4). This is due to the fact that the action of the cables 64 on the pulleys 60 will rotate the lift arms 32 forwardly (i.e., counter-clockwise in FIG. 4) during the last stages before the lift arms 32 reach a vertical position. Thus, the fulcrum pulleys are automatically swung forwardly of the axis 34 as the boat is raised.

Such automatic movement, however, does not occur during unloading of the boat. Accordingly, the control arms 44 are arranged in their rearwardmost positions and are fixed thereat by pins inserted through the brackets 54 and cylinders 46. The winch motor is actuated to wind-in the cable 64, whereby the boat is gradually raised (FIG. 5). Since the pulleys 60, 62 are located rearwardly of the pivot axis 34, the lift arms 32 are able to travel to a position E whereby the center of gravity is located rearwardly of the pivot axis 23. At this point, the weight of the boat tends to rotate the lift arms 32 rearwardly but cannot do so to any appreciable extent until the operator reverses operation of the winch motor. Thereafter, the cable 64 is payed-out and the boat generally gravitates onto the ground (or water).

As noted earlier, the fulcrum pulleys 60, 62 are shiftable between positions fore and aft of the axis 34. As regards the positioning of the fulcrum pulleys aft of the axis 34 during an unloading operation, it should be noted that it is not absolutely necessary for the pulleys 60, 62 to be located rearwardly of the axis 34 prior to beginning the unloading operation as depicted in the drawings. The reason for this is that as the boat is picked-up and swung gradually rearwardly, the vehicle rocks somewhat clockwise about the rear axle, due to the weight of the boat, thereby shifting the pulleys 60, 62 further rearwardly. Accordingly, even if the pulleys are located directly over, or slightly forwardly of, the axis 34 at the start of an unloading operation, they will be inherently shifted rearwardly thereof as the boat reaches its highest position.

During periods of transport when the boat is supported atop the carrier vehicle, the support assembly 23, lift arms 32, and cross member 36 can be removed and stored in the boat 12.

The loader according to the present invention is advantageous because it can be operated easily by a single person and requires no manual pushing or maneuvering of the object being loaded. The components of the mechanism are simple to assemble and disassemble for storage before and after the object has been loaded. Objects such as boats can be loaded while in an upright position and thus, if desired, can be directly picked-up from, and set down into, the water.

Although the invention has been described in connection with a preferred embodiment thereof, it will be appreciated by those skilled in the art that modifications, additions, substitutions and deletions not specifically described may be made without departing from the spirit and scope of the invention as defined in the appended claims.

For example, any kind of carrier vehicle may be employed for receiving the object being loaded. Also, the boat being loaded could be raised while in an inverted position, if desired, by relocating the brackets 104. A hand-powered winch, rather than an electrically-powered winch, could be employed. Many different forms of connections between the lift arms 32 and the boat (or other object) could be employed.

If desired, the loading/unloading mechanism of the present invention could be mounted on a trailer, rather than on a carrier vehicle. This would enable a boat to be loaded and unloaded directly to and from the water, without requiring the trailer to enter the water. Thus, the usual water-produced damage to the trailer could be avoided.

What is claimed is:

1. Apparatus for loading an object onto a carrier vehicle having support means for receiving the object, said apparatus comprising:

lift means connectible to the carrier vehicle and including a pair of lift arms mounted at inner ends for vertical swinging movement about a horizontal rotary axis, connector means connectible to outer ends of said lift arms for connecting said lift arms to the object, a power winch assembly mounted on the carrier vehicle remotely of said lift arms in the direction toward which the object is to be loaded and including cable means connected to said lift arms for swinging the latter about said rotary axis, cable fulcrum means mounted on the carrier vehicle, said cable means engaging said fulcrum means, said fulcrum means being movable between a first position located to one side of said rotary axis toward the vehicle, and a second position located to the other side of said rotary axis away from the vehicle, said power winch assembly being actuable during a loading mode:

in a first direction for winding-in said cable means to raise said lift arms and object and shift the center of gravity of the object toward the vehicle and past said rotary axis, with said fulcrum means located in said first position, whereupon further loading movement of said lift arm is prevented by said cable means, and thereafter in a second direction for paying-out said cable means to allow the object to gravitate downwardly onto the support means of the carrier vehicle, said power winch assembly being actuable during an unloading mode:

in said first direction for winding-in said cable means to raise the object from the support means and shift the center of gravity of the object away from the vehicle and past said rotary axis, with said fulcrum means located in said second position, whereupon further unloading movement of said lift arms is prevented by said cable means, and thereafter in said second direction for paying-out said cable means to allow the object to gravitate downwardly to an unloaded position.

2. Apparatus according to claim 1, wherein said connector means forms a horizontal pivot connection between said lift arm means and the object at generally the center of gravity thereof, allowing free swinging movement of the object relative to said lift arm means.

3. Apparatus according to claim 1 further including control arm means pivotably mounted to the carrier vehicle permitting movement of the outer end of said control arm means to opposite sides of said rotary axis, said fulcrum means being mounted at an outer end of said control arm means.

4. Apparatus according to claim 3, wherein said fulcrum means comprises a pair of vertically spaced pulleys.

5. Apparatus according to claim 3 including means for securing said control arm means in a position wherein said fulcrum means is located past said rotary axis in a direction away from the vehicle.

6. Apparatus according to claim 3, wherein said control arm means includes a telescoping element which is securable in an extended position.

7. Apparatus according to claim 3, wherein said lift arm means comprises a pair of arms located on opposite sides of said carrier vehicle, said control arm means comprises a pair of control arms located on opposite sides of said carrier vehicle, said winch assembly comprises a pair of motor-driven drums located on opposite sides of said carrier vehicle, and said cable means comprising a pair of cables wrapped around said drums.

8. Apparatus according to claim 1, wherein the object to be loaded is a boat, said connector means being arranged to connect to the boat while the latter is in a right-side-up condition.

9. Apparatus for loading an object onto a carrier vehicle having support means for receiving the object, said apparatus comprising:
    lift arm means connectible at the inner end thereof to the carrier vehicle for vertical swinging movement about a horizontal rotary axis,
    cable drum means mounted remotely of said lift arm means in the direction toward which the object is to be loaded,
    cable means connectible to said drum means and to said lift arm means for swinging the latter about said horizontal rotary axis in response to rotation of said drum means,
    fulcrum means mounted on said carrier vehicle,
    said cable means engaging said fulcrum means,
    drum rotating means connected to said drum means and actuable during a loading mode to rotate said drum means:
        in a first direction for winding-in said cable to raise said lift arms and object connected thereto and shift the center of gravity of said object toward the carrier vehicle and past said rotary axis, whereupon further loading movement of said lift arm means is prevented by said cable means, and thereafter
        in a second direction for paying-out said cable means to allow the object to gravitate downwardly onto the support means of the vehicle,
    said drum rotating means being actuable during an unloading mode to rotate said drum means:
        in said first direction for winding-in said cable means to raise said object from the support means and shift the center of gravity thereof away from the carrier vehicle and past said rotary axis, whereupon further unloading movement of said lift arm means is prevented by said cable means, and thereafter
        in a second direction for paying-out said cable means to allow the object to gravitate downwardly to an unloaded position.

10. Apparatus according to claim 9, wherein said fulcrum means is movably mounted on said carrier vehicle so as to be positionable past the rotary axis in a direction toward the carrier vehicle during the loading mode and past the rotary axis in a direction away from the carrier vehicle during an unloading mode.

11. Apparatus according to claim 9, wherein the object to be loaded is a boat, said connector means being arranged to connect to the boat while the latter is in a right-side-up condition.

12. Apparatus for loading a boat onto a carrier vehicle having support means for receiving the boat, said apparatus comprising:
    support means connected to a rear end of the carrier vehicle,
    a pair of lift arms connected at their inner ends to said support means for swinging movement about a first horizontal rotary axis,
    connector means connected to outer ends of said lift arms for connecting said lift arms to the boat,
    a pair of cable drums rotatably mounted at opposite sides of the carrier vehicle and each having a cable wrapped therearound,
    said cables connected to said lift arms for swinging the latter about said first rotary axis in response to rotation of said drums,
    a pair of control arms mounted at opposite sides of said vehicle, said control arms being connected at lower ends thereof for swinging movement about a second horizontal rotary axis,
    a pair of vertically-spaced fulcrum pulleys mounted at the upper end of each of said control arms,
    said cables passing between respective pairs of said fulcrum pulleys, said control arms swingable to position said fulcrum pulleys in a first position located to one side of said first rotary axis toward the vehicle, and in a second position located to the other side of said first rotary axis away from the vehicle,
    motor means connected to said drums for rotating the latter during a loading mode:
        in a first direction for winding-in said cables to raise said lift arms and boat and shift the center of gravity of the boat toward the vehicle and past said first rotary axis, with said fulcrum pulleys located in said first position, whereupon further loading movement of said lift arms is prevented by said cables, and thereafter
        in a second direction for paying-out said cables to allow the boat to gravitate downwardly onto the support means,
    said motor means being actuable during an unloading mode for rotating said drums:
        in said first direction for wingin-in said cables to raise the boat from the support means and shift the center of gravity thereof away from the vehicle and past said rotary axis, with said fulcrum pulleys located in said second position, whereupon further unloading movement of said lift arms is prevented by said cables, and thereafter
        in said second direction for paying-out said cables to allow the boat to gravitate downaredly to an unloaded position.

* * * * *